United States Patent [19]

Luke et al.

[11] 4,231,633

[45] Nov. 4, 1980

[54] NEUTRAL BAR, LUG AND BARRIER ASSEMBLY

[75] Inventors: Roger D. Luke, Norcross; John M. Rhodes, Atlanta, both of Ga.

[73] Assignee: Gould Inc., Rolling Meadows, Ill.

[21] Appl. No.: 945,799

[22] Filed: Sep. 26, 1978

[51] Int. Cl.³ .............................................. H01R 9/10
[52] U.S. Cl. .................................................... 339/242
[58] Field of Search .................. 339/22 B, 198 R, 242

[56] References Cited

U.S. PATENT DOCUMENTS

| 3,516,049 | 6/1970 | Goodridge | 339/242 |
| 3,594,710 | 7/1971 | Stanback | 339/242 |
| 3,727,171 | 4/1973 | Coles et al. | 339/242 |

Primary Examiner—Joseph H. McGlynn
Attorney, Agent, or Firm—Ostrolenk, Faber, Gerb & Soffen

[57] ABSTRACT

A main lug is secured to a neutral bar so as to be mounted at a selected position along the length of the latter. An insulating element constituting a wireway barrier is selectively positionable on the bar along with the lug, and is held in operative position by the latter.

6 Claims, 8 Drawing Figures

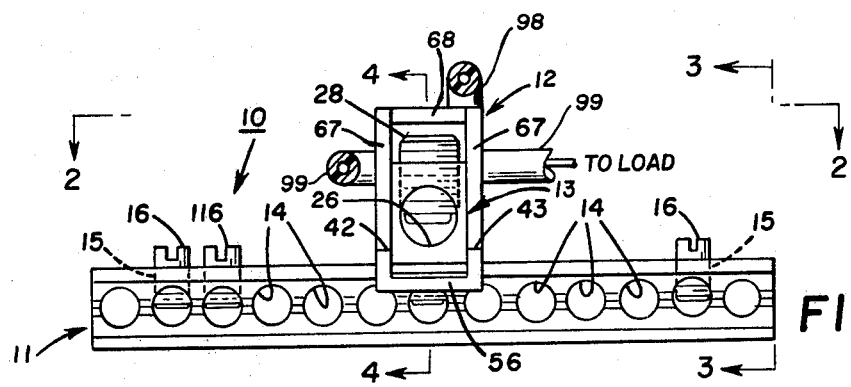
FIG.1
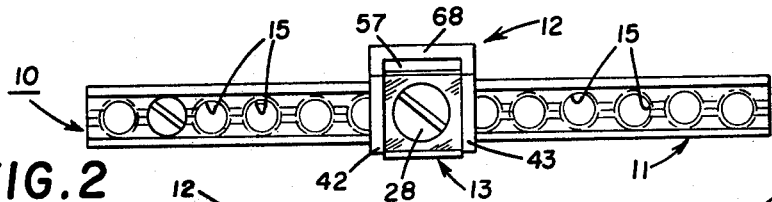
FIG.2
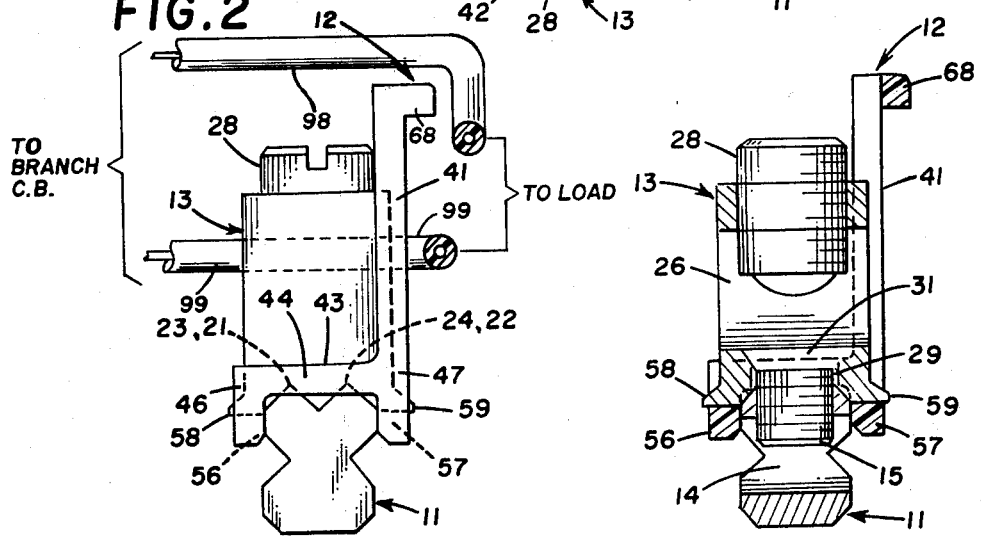
FIG.3
FIG.4

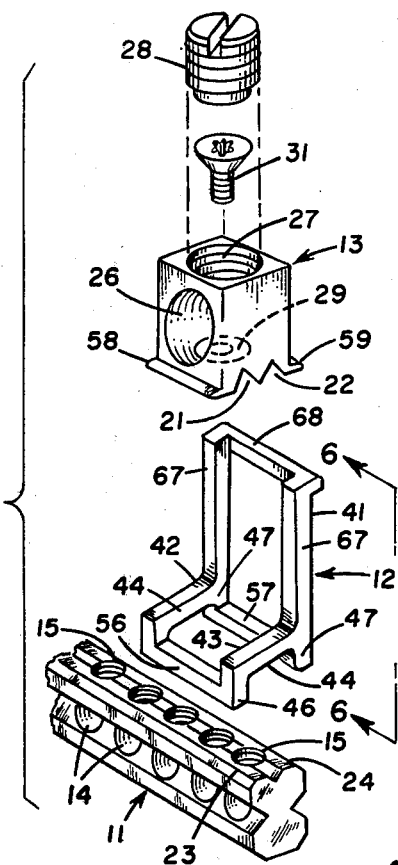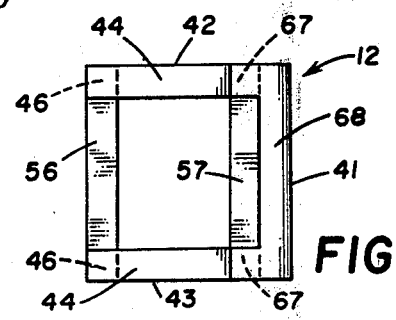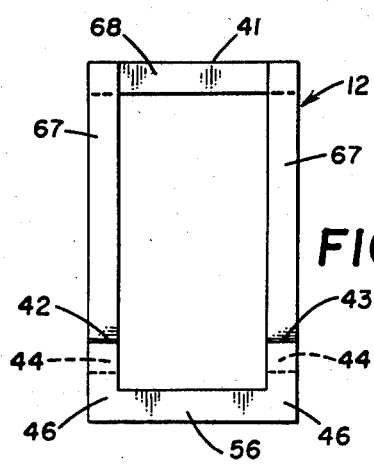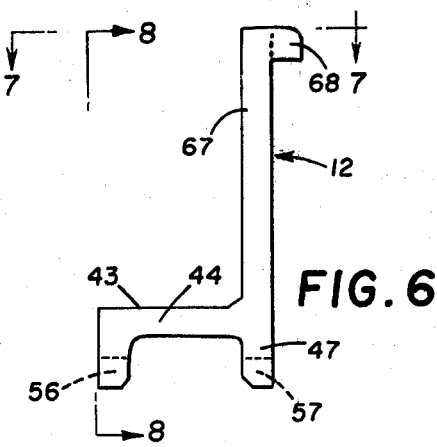

NEUTRAL BAR, LUG AND BARRIER ASSEMBLY

This invention relates to neutral bar means in general and more particularly relates to neutral bar means combined with a field installable relatively large wire grip lug and an insulation barrier which are selectively positionable along the length of the neutral bar.

In many panelboards for industrial applications the neutral bars thereof are provided with a terminal lug or wire grip which is large enough to receive a relatively large diameter conductor, typically a 1/0 conductor. However this terminal lug is positionable only at a single fixed location which, in many instances, is inconvenient because of available wire lengths of because of crowded conditions.

To overcome this disadvantage of the prior art, the instant invention provides a neutral bar and connector lug combination which permits the lug to be selectively positioned along the length of the neutral bar at a location which is convenient for wiring. This is accomplished by utilizing a neutral bar having a plurality of transverse wire receiving bores each associated with an individual threaded aperture which extends to the front surface of the neutral bar. These threaded apertures normally receive clamping screws which engage and hold wires in the associated bores. The connector lug is seated on the front surface of the neutral bar and is held in desired longitudinal position by a screw entered into a selected one of the threaded apertures.

Associated with the connector lug is a molded plastic element defining a wireway which directs wires around the lug. The latter is repositioned with the lug, and is held in position solely as a result of mounting the connector lug to the neutral bar.

Accordingly, a primary object of the instant invention is to provide a novel construction for a wiring means including an elongated terminal bar and a terminal connector lug selectively positionable along the length of the bar.

Another object is to provide a wiring means of this type which also includes an insulating barrier element associated with the connector lug and selectively positionable along the bar together with the lug.

A further object is to provide a wiring means of this type in which the connector lug will accept wire of much larger diameter than will other connector means with which the terminal bar is provided.

A still further object is to provide a wiring means of this type in which the terminal connector lug and its associated barrier insulator are readily repositionable in the field.

These objects as well as other objects of this invention shall become readily apparent after reading the following description of the accompanying drawings in which:

FIG. 1 is a side elevation of wiring means constructed in accordance with teachings of the instant invention.

FIG. 2 is a front elevation of the wiring means of FIG. 1 looking in the direction of arrows 2—2 of FIG. 1.

FIG. 3 is an end view of the wiring means of FIG. 1 looking in the direction of arrows 3—3 of FIG. 1.

FIG. 4 is a cross-section through line 4—4 of FIG. 1 looking in the direction of arrows 4—4.

FIG. 5 is an exploded perspective of the elements constituting the wiring means of FIG. 1.

FIG. 6 is an elevation of the insulating barrier element looking in the direction of arrows 6—6 of FIG. 5.

FIGS. 7 and 8 are additional elevations of the insulating barrier element looking in the directions of the respective arrows 7—7 and 8—8 of FIG. 6.

Now referring to the Figures. In FIGS. 1 and 2 wiring means constructed in accordance with teachings of the instant invention is indicated generally by reference numeral 10. This wiring means 10 includes elongated conducting terminal bar 11, insulating barrier element 12, and terminal connector lug 13. As will hereinafter be seen, barrier 12 and lug 13 are mounted to bar 11 at a selected position along the length thereof. Terminal bar 11 is typically used as a neutral bar in a panelboard (not shown) and for such application is provided with a plurality of parallel bores 14 extending transversely through bar 11 from side-to-side thereof. Communicating with each of the bores 14 is an individual threaded aperture 15 extending to the front surface of bar 11. As is well known to the art, apertures 15 receive individual clamping screws 16 for engaging and thereby holding wires (not shown) entered into the respective bores 14.

Terminal lug 13 is a block-like element constructed of good electrically conductive material have V-grooves 21, 22 in the bottom surface thereof which receive longitudinally extending ribs 23, 24 formed in lug 11 at the front thereof. The cooperation between grooves 21, 22 and ribs 23, 24 prevents lug 13 from pivoting with respect to bar 11. Lug 13 is provided with through recess 26 extending parallel to bores 15. Threaded aperture 27 extends from recess 26 to the front of lug 13 and receives clamping screw 28. The latter engages and thereby holds one or more wires (not shown) entered into recess 26. Clearance aperture 29 extends from recess 26 to the rear of lug 13. The latter is of substantially larger diameter than any of the bores 14 so that recess 26 will accept much larger diameter than can be received by individual bores 14. Holding screw 31 extends rearward through aperture 29 to be received by a selected one of the threaded apertures 15 for retaining lug 13 mounted to bar 11 at a selected location along the length thereof.

Barrier 12 provides a so-called wireway which facilitates positioning of wiring, such as the two branch or load wires 98, 99, fragmentary portions of which are shown in FIGS. 1 and 3, having opposite phase or polarity from neutral lug 13 from contacting the latter. Barrier 12 includes frame-like main rectangular section 41 which extends from bar 11 forward of lug 13 and is positioned at one side of bar 11. Barrier 12 is also provided with two parallel U-shaped sections spaced along the longitudinal axis of bar 11. Each U-shaped section 42, 43 includes relatively short legs 46, 47 connected at their front ends by web 44. The latter extends transversely across the front of bar 11 lying adjacent thereto.

Barrier 12 also includes rods 56, 57 positioned adjacent opposite sides of bar 11 and extending parallel to the longitudinal axis thereof. Rod 56 extends between the rear ends of legs 46, and rod 57 extends between the rear ends of legs 47. Spaced parallel side 67, 67 of main section 41 are connected at their forward ends by longitudinally extending rod 68. Sides 67, 67 are positioned as forward projections of legs 57, 57 in axial alignment with the latter.

Securement of barrier 12 in operative position along the length of bar 11 is achieved through the cooperation of bar 11 and lug 13. More particularly, side-to-side and rearward movement of barrier 12 with respect to bar 11 is prevented by U-shaped formations 42, 43. Formations 58, 59 along the lower side edges of lug 13 are positioned in front of the respective rods 56, 57 to prevent forward movement of barrier 12. Movement of the latter longitudinally with respect to bar 11 is prevented through the cooperation of webs 44, 44 with the ends of lug 13.

Thus it is seen that the instant invention provides a simplified neutral bar lug and wireway barrier construction whereby a main lug may be operatively positioned selectively along the length of a neutral bar. A construction of this type is readily adaptable for utilization in a panelboard of the type illustrated in our copending application Ser. No. 920,153, filed June 29, 1978, entitled Electric Distribution Panel Having Extruded Base.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. Wiring means including an elongated terminal bar and a terminal connector, a plurality of parallel wire receiving bores extending transversely and sideways through said bar and spaced along the axis thereof, an individual threaded aperture extending from each of said bores to the front of said bar, said apertures normally receiving clamping screws which engage wires disposed in said bores, said connector being selectively positionable along the length of said bar at locations defined by said threaded apertures, a holding screw in threaded engagement with a selected one of said threaded apertures to secure said connector to the front of said bar at the location defined by said selected aperture, a wire receiving recess in said connector, a clamping screw threadably mounted on said connector and extending into said recess to engage a wire therein, said recess being sized to receive a wire substantially larger in diameter than the largest wire receivable by any of the bores, an insulating barrier element mounted on said bar to define a wireway which normally directs wires around the connector, said element including a main section positioned at one side of said bar and extending forward of said connector, said connector including formations operatively positioned in cooperating relationship with additional formations of said element to retain said element mounted to said bar.

2. Wiring means as defined by claim 1 in which the element also includes first and second U-shaped sections each including first and second legs connected at their front ends by a web extending across the front of said bar and transverse thereto, said sections being spaced along the longitudinal axis of the bar and said connector being disposed between said webs.

3. Wiring means as defined by claim 2 in which the element also includes first and second rods disposed adjacent opposite sides of said bars, said first rod operatively connecting said first legs at their rear ends and said second rod operatively connecting said second legs at their rear ends, said additional formations including said first and second rods.

4. Wiring means as defined by claim 3 in which the main section is framed-like.

5. Wiring means as defined by claim 4 in which the main section includes sides in axial alignment with each of said second legs.

6. Wiring means as defined by claim 5 in which there are formations at the front of said bar cooperating with formations at the rear of the connector to lock the connector against rotation relative to the bar.

* * * * *